United States Patent [19]

Kolchin et al.

[11] 4,290,741

[45] Sep. 22, 1981

[54] DEVICE FOR BUILDING-UP HIGH PRESSURE

[76] Inventors: Anatoly V. Kolchin, Simferopolsky proezd, 5, kv. 40; Vladimir I. Veprintsev, Chongarsky bulvar, II, korpus I, kv. 30; Lev I. Klyachko, ul. Televidenia, I9, korpus, 3, kv. 204; Alexandr S. Novgorodov, Timiryazevskaya ul., 34, korpus I, kv. 51; Vladimir M. Zubkov, Profsojusnaya ul. 39, kv. 45; Leonid F. Vereschagin, Kutuzovsky prospekt, 2/I, kv. 23, all of Moscow; Lev G. Khvostantsev, Shkolnaya ul., 4, kv. 62; Albert P. Novikov, Tsentralnaya ul, IO, kv. 59, both of Izmiran Moskovskaya oblast, Podolsky raion; Sergei I. Yanshin, deceased, late of Moscow, Klavdia M. Yanshina; Elena S. Yanshina, both of Varshavskoe shosse, 6/8, kv. I45, Moscow; Ivan S. Yanshin, u. Ostrovskogo, 38, kv. 6; Zinaida P. Yanshina, Krivoarbatsky pereulok, 6, kv. IO, both of Moscow, administrators, all of U.S.S.R.

[21] Appl. No.: 20,409

[22] Filed: Mar. 14, 1979

Related U.S. Application Data

[63] Continuation of Ser. No. 547,343, Feb. 5, 1975, abandoned, which is a continuation-in-part of Ser. No. 498,667, Aug. 19, 1974, abandoned, which is a continuation of Ser. No. 424,079, Dec. 12, 1973, abandoned, which is a continuation of Ser. No. 261,636, Jun. 12, 1972, abandoned, which is a continuation of Ser. No. 104,231, Jan. 6, 1971, abandoned.

[51] Int. Cl.$^3$ .............................................. B30B 11/32
[52] U.S. Cl. ............................... 425/77; 425/DIG. 26
[58] Field of Search .......... 425/77, DIG. 42, DIG. 46

[56] References Cited

U.S. PATENT DOCUMENTS

| | | | |
|---|---|---|---|
| 2,354,241 | 7/1944 | Anderson | 18/DIG. 42 |
| 2,941,243 | 6/1960 | Bundig | 18/DIG. 26 |
| 2,941,244 | 6/1960 | Wentorf | 18/DIG. 26 |
| 2,961,713 | 11/1960 | Hartley | 18/DIG. 42 |
| 2,976,575 | 3/1961 | Daubenberger | 18/DIG. 42 |
| 3,089,189 | 5/1963 | Feldman et al. | 18/DIG. 26 |
| 3,121,913 | 2/1964 | Hagmann et al. | 18/DIG. 42 |
| 3,134,139 | 5/1964 | Wentorf | 18/DIG. 26 |
| 3,383,737 | 5/1968 | Greger | 18/DIG. 26 |

Primary Examiner—J. Howard Flint, Jr.
Attorney, Agent, or Firm—Holman & Stern

[57] ABSTRACT

A device for building-up high pressures, in which the die surfaces facing each other are provided with circular grooves intended to be filled with a solid medium and arranged concentrically to, and beyond, the central sections of the dies. On closing of the dies, these circular grooves form spaces filled with the solid medium.

6 Claims, 1 Drawing Figure

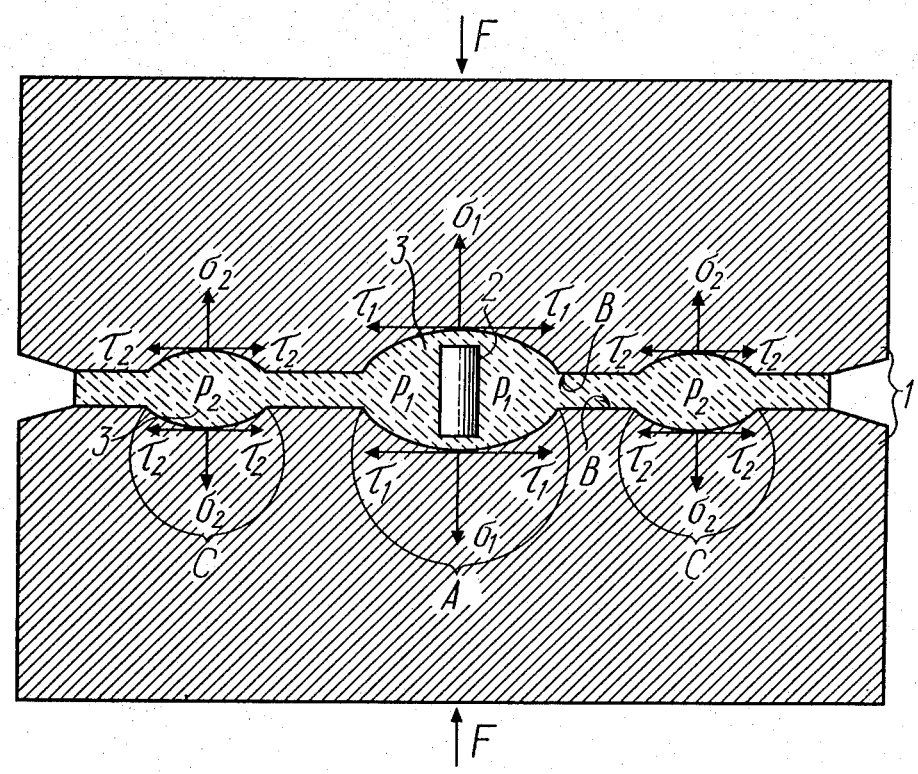

DEVICE FOR BUILDING-UP HIGH PRESSURE

BACKGROUND OF THE INVENTION

The present invention is a continuation of application Ser. No. 547,343 filed Feb. 5, 1975, now abandoned, which in turn is a continuation-in-part of application Ser. No. 498,667 filed Aug. 19, 1974 which in turn is a continuation of application Ser. No. 424,079, filed Dec. 12, 1973 which in turn is a continuation of application Ser. No. 261,636 filed June 12, 1972 which in turn is a continuation of application Ser. No. 104,231 filed Jan. 6, 1971, all of which have been abandoned in favor of the present application.

The present invention relates to devices for building-up high pressure.

The invention can be used for the synthesis of diamonds and will prove no less effective in studying the physical properties of a solid body at low and high temperatures and in magnetic fields under high pressures.

PRIOR TECHNIQUES

The known devices for building-up high pressure comprise two identical and coaxial dies facing each other. Placed between the central sections of these dies is a specimen to be studied surrounded by a solid medium which is capable of transmitting to the specimen the pressure built-up in the medium when the dies are being drawn together.

The term "solid medium" is used here to denote such materials generally known in the high pressure technique as pyrophyllite and catlinite-lithographic stone.

The term "central section" of the dies is used here to denote that particular portion of the dies which contains the specimen and in which the highest pressure is built-up.

The main principle of building-up high pressure in the devices with the solid pressure-transmitting medium is based on the combination of compression and flow of this medium between the dies when these dies are being drawn together and on producing a certain pressure gradient when the solid medium flows through the slot—like gaps between the dies from their central section to the periphery.

The known devices for building-up high pressure have a considerable disadvantage, i.e. a large pressure gradient in the solid medium located between the dies, occurring in the direction of flow of the solid medium, brings about critical stresses in the dies, leading to their failure.

The large pressure gradient in the solid medium limits the possibility of producing high pressures (about 200-300 kilobars) in large-size specimens and calls for making the dies from high-strength and costly materials.

In the known devices, the closing travel of the dies is comparatively small so that it limits the dimensions of the specimen. This is attributable to the fact that the solid medium located between the central sections of the dies is subjected to the maximum built-up pressure while its outer edge is under atmospheric pressure. Therefore, the solid medium can be held between the dies only due to its internal friction and the sliding friction between the medium and the die surfaces. This is attainable when the thickness of the solid medium is very small (about several hundredths of 1 mm), which limits the dimensions of the specimen.

As a result, it becomes difficult in the known devices to introduce thermocouples into the space between the dies for measuring the dies for measuring the parameters of the process (the thermocouple wire breaks).

Certain apparatuses for building-up high pressure and high temperature attempting to eliminate the above-mentioned disadvantages are known, for example, "Apparatus for building-up high pressure and high temperature," Bundy, disclosed in U.S. Pat. No. 2,941,243. The object of this known invention was to provide a novel and improved compact-size apparatus for building-up pressure, to be convenient to manufacture and assemble.

This known apparatus for building-up high pressure comprises two dies whose surfaces facing each other have recesses. The recesses are encircled and restricted by a raised circular edge (rim). These recesses of the dies are used to house the reaction vessel with a specimen and the circular thermal and electrical insulation counterpressure lining. The lining surrounds the vessel sides around and keeps heat and pressure inside the cylinder. The lining narrows (sharpens) towards the sides and is so positioned that its external edge is fitted and blocked by means of the rims of the two dies, preventing the side extrusion which is accompanied with a pressure reduction in the reaction vessel. Pyrophyllite and catlinite are the preferable materials for the counterpressure lining. The basic principle of building-up high pressure in the discussed apparatus is based on compressing the reaction vessel with specimen and on the combination of compression and outside extrusion in the radial direction of a portion of the counterpressure lining. At the initial position, the raised rims of the dies are at a certain distance apart from each other, thus defining a narrow circular slot-like space which is also filled with the lining material.

The dies with this shaping of the opposed surfaces suffer from the following disadvantages. In the course of building-up high pressure in the counterpressure lining, the raised rims of the dies are not supported by any radial force acting on the rims from the external side towards the center of the specimen. The external radial force would firstly, prevent the raised rims from premature destruction, and secondly, the radial force would obstruct the extrusion of the counterpressure lining. As a result, higher pressures would become achievable.

One of the methods for the provision of that-like radial force was envisaged in an other embodiment of the high-pressure apparatus, wherein the reaction vessel with a seal is surrounded by a compressible dielectric lining possessing the same properties as of rubber or plastics. The lining is confined between the internal and external rims of the opposed dies. Soft steel rings are positioned over the periphery of the seal. This lining electrically insulates one of the rings from the die. When the dies are being drawn together, the seal comes under a pressure generated due to the radial extension of the rings. The pressure generated in the seal comes to bear on the external side of the rims of the dies, thus preventing their premature destruction and obstructing the extrusion of the counterpressure lining. As a result, there should be an increased pressure in the specimen and the counterpressure lining which surrounds it.

The following disadvantages should be accrued to this design.

First of all, the seal material is rubber or plastic, i.e. materials which are highly compressible. Therefore, when the dies are being drawn together and the rings are being radially extended, light (low) pressures occur in the seal, which are not able to effectively resist the extrusion of the counterpressure lining and to strengthen the internal rims of the dies. At the same time, if the seal material was one of less compressibility, for example catlinite, it would be impossible to build-up in it and hold higher pressures due to the radial extension of the soft steel rings. Thus, for building-up high pressure in the seal, this device would require massive (thick in the radial direction) rings capable of building-up and holding said pressure in the seal.

Another disadvantage of the known device is that no wires (leads) or some kind of radiation can be introduced through the space between the dies to the specimen. This is prevented by the steel rings.

There is known an apparatus for building-up high pressures at high temperatures as disclosed in U.S. Pat. No. 2,941.244.

The principal object of this invention was to provide an apparatus assuring increased overall dimensions of the reaction vessel. This object is achieved due to the provision of a reaction vessel which is positioned inside a pair of pressure-resisting internal elements, with the external electrically and thermally insulating elements between the two opposing dies having recesses which are spaces in the form of a truncated cone. This makes it possible to subject the enlarged chamber with a specimen to the action of high temperatures and high pressures.

An apparatus is known for building-up high pressures, as disclosed in U.S. Pat. No. 3,134,139. One object of the invention is to improve an apparatus for building-up high pressures and high temperatures. Another object is to provide an improved multi-punch apparatus for building-up high pressures and high temperatures, wherein not all the punches are displaced for the compression of the specimen material. One more object of this invention is to provide a multi-punch apparatus, wherein vertical pads are used in combination with horizontal punches.

This apparatus, in one of its embodiments, comprises two wide massive pads with opposing flat surfaces spaced a certain distance apart and several horizontal punches which are displaced radially and inwards between the flat pads, forming the reaction space wherein a specimen material is positioned to be subjected to the action of high pressures and high temperatures. The specimen is compressed in the reaction space due to the displacement of the horizontal punches towards each other. The configuration of the reaction space depends on the shape of the punch surfaces and on the number of punches used.

In another embodiment, this apparatus comprises two opposing flat pads, each having a recess in the form of a hollow truncated cone. The recess accommodates several, for example, four horizontal punches. The cone of the recess and pads matches the cone of the punches whose cross section is shaped as a truncated cone. When the pads are being drawn together, the punches are also sliding inwards, thus compressing the specimen material in the reaction space.

As it may be seen from the above cited inventions, the relevant high-pressure apparatus failed to achieve one of the main objects in the field of designing the high-pressure equipment, i.e. provision of a smooth pressure gradient in the solid medium between the dies, in the radial direction from the central sections of the dies towards their periphery. This leads to the extremely irregular distribution of stresses in the body of the dies, which, in its turn, causes their rapid destruction in the course of operation, often permitting their single use only. These disadvantages limit the scope of application of the known apparatus for building-up high pressure.

OBJECT AND SUMMARY OF THE INVENTION

The principal object of our invention is to provide a device for building-up high pressure with such dies which, when being drawn together, ensure a smooth pressure gradient in the solid medium in the direction from the central section of the dies towards their periphery.

The above and other objects are accomplished by providing a device for building-up high pressure wherein, according to the invention, the die surfaces facing each other have circular grooves located concentrically to the central sections and beyond their limits, with these grooves forming spaces which are filled with the solid medium when the dies are being drawn together.

Due to such a design of the dies, the present device ensures a smooth pressure gradient in the solid medium in the direction from the central section of the dies towards their periphery, thereby ensuring uniform distribution of stresses in the dies.

BRIEF DESCRIPTION OF THE DRAWING

The present invention will be more clear from the following description of one of its embodiments given by way of example with reference to the accompanying drawing in which the sole FIGURE shows schematically in cross-section a device for building-up high pressure, according to the present invention.

DETAILED DESCRIPTION OF THE INVENTION

The present device for building-up high pressure comprises two identical coaxial dies 1 facing each other, with their central sections A containing a specimen 2 being studied surrounded by a solid medium 3 which is capable of transmitting to the specimen, the pressure built-up in the medium when the dies 1 are being drawn together. The solid medium 3 may be represented by such material commonly known in the high pressure technique as pyrophyllite and catlinite, i.e. lithographic-stone. According to the invention, surfaces B of the dies 1 facing each other are provided with circular grooves C located concentrically with respect to the central sections A filled with the solid medium 3 and beyond these sections to accommodate the solid medium 3 therein. On closing of the dies 1 the grooves C form a toroidal space filled with the solid medium 3.

The present device functions as follows:

When the dies 1 are brought together, force F produces pressure $P_1$ in the solid medium 3 located between the central sections A of the dies, and pressure $P_2$ in the solid medium 3 contained in the space formed by the circular grooves C.

Pressure $P_2$ opposes the outflow of the solid medium subjected to pressure $P_1$. Therefore, the solid medium 3 subjected to pressure $P_1$ can be regarded as being in a closed space which is subjected to pressure $P_2$ directed from the circular grooves C. As a result, even at the maximum attainable pressure $P_1$ (about 200 kilobars), the thickness of the solid medium between the dies ranges from 0.8 to 1 mm.

This allows the closing travel of the dies 1 to be increased, thus raising the maximum attainable pressure in the solid medium 3 contained between the central sections of the dies, increasing the dimensions of the specimens and making it possible to introduce the thermocouple into the space between the dies in the process of building-up high pressure.

The presence of pressure $P_2$ ensures a smooth pressure gradient in the solid medium enclosed between the dies and creates an additional "support" for the central sections A of the die. The effect of pressure $P_2$ produces tangential stresses $\tau_2$ in the body of the die in the zone of the circular grooves C, with the stresses being directed against tangential stresses $\tau_1$ occurring in the zone of the central section A of the die under the effect of pressure $P_1$. Inasmuch as pressure $P_2$ is considerably lower than pressure $P_1$, the tangential stresses $\tau_2$ produced by it are not very strong either. As a result, the die is not subjected to strong shearing strain either in the internal or external areas relative to the circular grooves C.

Along with the tangential stresses $\tau$, there arise normal stresses in the area of the central section A of the die under the effect of pressure $P_1$; the magnitude of the normal stresses is larger than that of the normal stresses $\sigma_2$ which arise in the area of the circular grooves C under the effect of pressure $P_2$.

Thus, the central section A of the die 1 subjected to the maximum normal $\sigma_1$ and tangential $\tau_1$ stresses is "supported" by the section of the die which is provided with the circular grooves C and which is acted upon by lower stresses $\sigma_2$ and $\tau_2$.

Such an arrangement promotes high operational reliability of the present device and, in addition, allows the dies to be made of non-magnetic and even non-metallic (ceramics) materials or of a combination of different materials.

This, in turn, broadens the field of application of the present device; thus, it can be successfully used for testing specimens in magnetic fields and with the aid of an X-ray radiation method, nuclear magnetic resonance and electronic paramagnetic resonance.

The smooth pressure gradient in the solid medium and the stresses $\sigma$ and $\tau$ in the dies 1 can be changed by providing one or more circular grooves in each die and by selecting the adequate shape of their cross section. This is done in order to create several toroidal spaces between the central section of the die and its outer section subjected to the atmospheric pressure so that the pressure in these spaces will gradually diminish from the maximum value in the central section of the die down to the atmospheric pressure at its periphery.

The smooth pressure gradient in the solid medium can also be obtained by varying the filling of the spaces formed by the circular grooves with the solid media whose coefficients of internal friction are either the same as the coefficient of internal friction of the solid medium contained between the central sections of the die or differ from it and diminish in the die spaces in the direction from the center of the dies towards their periphery.

The solid medium between the dies may be either pyrophyllite or catlinite. Combinations are also possible, such as: catlinite is used around the specimen between the central sections of the dies in the high pressure zone where the specimen is located, whereas the space formed by the circular grooves is preliminarily filled with pyrophyllite.

What we claim is:

1. In a device for building up pressure comprising a pair of identical coaxial dies facing each other, the dies being capable of being drawn together and having faces, outer peripheries and central sections, adapted to receive between the sections a specimen to be studied; a solid medium arranged between the central sections and adapted to surround the specimen being studied, the solid medium being capable of transmitting to the specimen the pressure build-up in the solid medium when the dies are being drawn together and means for confining the solid medium in the central sections when the dies are being drawn together; the improvement wherein the means for confining the solid medium consists of at least one annular circular groove located identically in each die in the face thereof concentrically outwardly of the central section and inwardly of the outer periphery of each die, said grooves being adapted to be filled with the solid medium and being defined by depressions whose inner and outer sides have annular raised arms, said grooves forming a toroidal space filled with the solid medium upon the closure of the dies, the outer side of the outermost annular circular groove of said at least one groove in each die when closed upon said solid medium being open to atmospheric pressure; said solid medium being a unitary body extending from the central section through to the outer side of said outermost circular groove; wherein the solid medium is selected from the group consisting of pyrophyllite, catlinite, or their combination.

2. The improvement of claim 1 wherein the solid medium is selected from the group consisting of pyrophyllite and catlinite.

3. The improvement of claim 1 wherein the central sections of the dies, when closed, substantially form an ellipsoidal space capable of containing the specimen surrounded by the medium, said ellipsoidal space being separated from said toroidal space by the inner rim of the closest annular circular groove.

4. The improvement of claim 3 wherein in planar cross-section through a vertical central axis common to both dies when closed, the central section substantially defines a primary ellipse and the opposing annular circular grooves each substantially define secondary ellipses, said primary ellipse having both a greater height and a greater width than said secondary ellipses.

5. The improvement of claim 4 wherein when said dies are closed upon said solid medium at a maximum attainable pressure of about 200 kilobars, the thickness of said solid medium between the dies is from 0.8 to 1 mm.

6. The improvement of claim 5 wherein a thermocouple is introduced into the space between the dies.

* * * * *